United States Patent [19]

Le Dily et al.

[11] 3,832,536

[45] Aug. 27, 1974

[54] INTEGRATOR CIRCUIT

[75] Inventors: Claude Le Dily, Villemoisson-sur-Orge; Dominique Lajotte, Paris, both of France

[73] Assignee: Compagnie Industrielle Des Telecommunications Cit-Alcatel, Paris, France

[22] Filed: Sept. 27, 1972

[21] Appl. No.: 292,781

[30] Foreign Application Priority Data

Sept. 27, 1971 France .............................. 71.34681

[52] U.S. Cl. ................. 235/183, 235/197, 328/127, 330/110

[51] Int. Cl. ............................................. G06g 7/18

[58] Field of Search ............ 235/183, 197; 330/110, 330/107; 307/317, 321, 323; 328/127, 151

[56] References Cited

UNITED STATES PATENTS

| | | | |
|---|---|---|---|
| 3,404,262 | 10/1968 | Udall | 235/183 |
| 3,541,462 | 11/1970 | Sarkisian et al. | 330/110 |
| 3,564,445 | 2/1971 | Brokaw | 330/110 |
| 3,566,088 | 2/1971 | Crook | 330/110 |
| 3,577,139 | 5/1971 | Foerster | 330/110 |
| 3,660,782 | 5/1972 | Friedman et al. | 328/127 |

FOREIGN PATENTS OR APPLICATIONS

| | | | |
|---|---|---|---|
| 1,804,389 | 7/1970 | Germany | 330/110 |

OTHER PUBLICATIONS

Esteban et al.: Dynamic Compensation Circuit, IBM Tech. Discl. Bull. Vol. 12, No. 8, January 1970, p. 1,316.

*Primary Examiner*—Felix D. Gruber
*Attorney, Agent, or Firm*—Craig & Antonelli

[57] ABSTRACT

Integrator comprising an operational amplifier having an input (E1)(−) and an input (E2)(+), and an output (S), with a resistance having a value of (R1) connected up between the input (E2) and the earth, a capacitor shunted by a resistor having an ohmic value of (R2) between the output (S) and the ihput (E1), the input voltage being applied to the input (E1) through a resistor having a value of R1), characterized in that the output (S) is connected up to the input (E2) by a network comprising two diodes connected up head to tail in parallel, in series with a resistor having an ohmic value equal to (R2).

4 Claims, 3 Drawing Figures

INTEGRATOR CIRCUIT

The invention comes within the sphere of analog calculating. It concerns an improvement to known integrators, improving their operation characteristics. It applies either to actual calculating elements, or to servo units, regulator units, etc.

The integrators used in electronic calculating currently use an operational amplifier having two inputs (−) and (+), the signal to be integrated being applied to the input (−), and a capacity being connected in parallel between the input (−) and the output of the amplifier. Such an integrator has an integrating function which is perfect in principle, but at very low frequencies, the high gain of the amplifier, which is no longer corrected by the negative reaction, may cause instability or the saturating of the amplifier. It is a known method to overcome that instability by shunting the integration capacitor with a resistor. But then, the function obtained is no longer a perfect integration, that defect being observed more especially at low frequencies, this having the effect of limiting the operating range of such an integrator in the vicinity of low frequencies.

The invention will be described with reference to the figures, among which:

Figure 1:
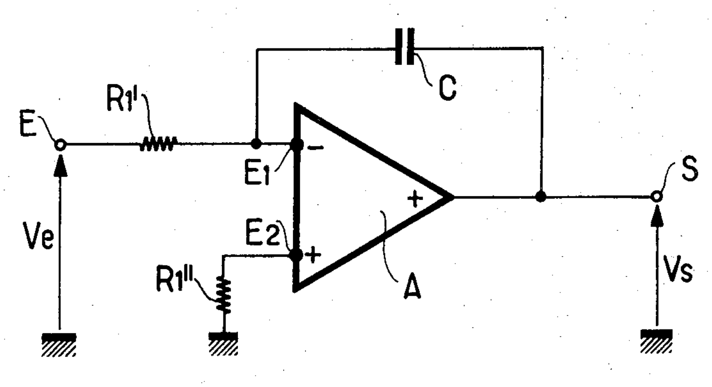
FIG. 1 is a diagram of a known integrator, of the type which is perfect in principle, but unstable in reality.

In FIG. 1, a known integrator comprises an operational amplifier A having a very great gain, with an input E1 (−), an input E2 (+) and an output S (+). An integration capacitor C is connected between E1 and S. The input voltage $Ve$ is connected to a terminal E, at the end of a resistor R1′, having an ohmic value $R1$, whose other end is connected to the terminal E1. The terminal E2 is connected to ground by a resistor R1″ having the same ohmic value $R1$. The output voltage $Vs$ is collected between the terminal S and ground.

The transfer function of such a circuit, as is well known, is equal to:

$$Vs/Ve = - 1/R1 \cdot Cp, \text{ with } p = j\,\omega \tag{1}$$

which is the expression of an integration.

But in practice, this circuit is difficult to use, for the operational amplifier has, when idle, a difference in interference potential between E1 and E2 ("offset" voltage). At very low frequencies, the negative reaction brought about by the capacitor C is without effect; the great gain of the amplifier A has the effect of bringing the output potential $Vs$ to a saturation level when the input voltage $Ve$ has a tendency toward zero.

Figure 2:
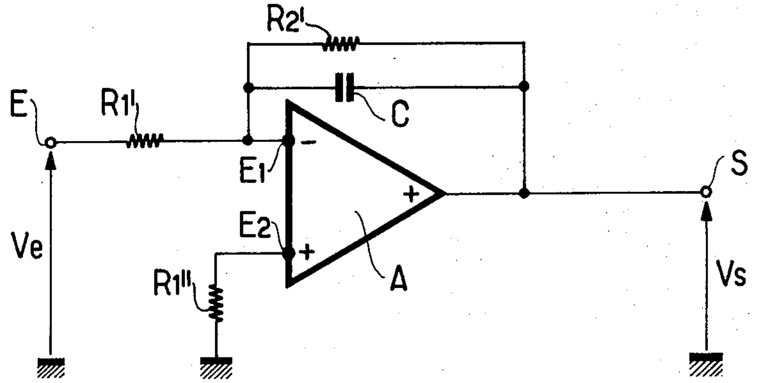
FIG. 2 is a known diagram of a negative reaction integrator, which corrects the instability of the diagram according to FIG. 1, but does not provide an absolutely correct integration.

It is known that the preceding disadvantage may be overcome by means of a negative reaction R2′ connected in parallel to the capacitor C, as seen in FIG. 2.

The transfer function of that negative reaction cirit is given by:

$$Vs/Ve = - [R2/R1\ (1 + R2 \cdot Cp)] \tag{2}$$

For low frequencies, when $p$ has a tendency towards 0, the result obtained is:

$$Vs/Ve = - (R2/R1)$$

The continuous stability is therefore ensured by the limiting of the gain at low frequency.

Nevertheless, on referring to the transfer function, which may be put in the form:

$$Vs/Ve = - [R2/R1\ (1 + R2Cp)]\ (-A/a + p)$$

taking $A = 1/R1 \cdot C$ and $a = 1/R2 \cdot C$, it will be seen that this circuit will operate all the better as an integrator as $p$ will be greater than $a$, that is, for the condition $$p >> a, \text{ that is, } p >> 1/R2 \cdot C$$

As $p = j\,\omega$, it will be observed that the value of $1/R2 \cdot C$ limits the low frequency below which the integration function is no longer correct.

Figure 3:
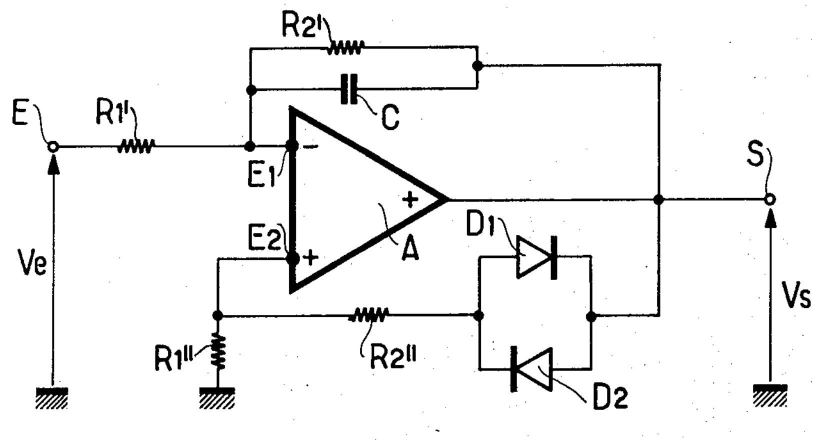
FIG. 3 is a diagram of an integrator according to the invention, providing an integration of the "perfect" type for an input voltage exceeding a certain level, while ensuring stability when idle.

In FIG. 3, according to the invention, the amplifier comprises, besides the elements provided in FIG. 2, a positive reaction path between output S and the input E2 of the operational amplifier A, constituted by a resistor R2″, having an ohmic value of $R2$, in series with two diodes D1, D2, connected back-to-back in parallel.

It may then be shown that the circuit according to FIG. 3 has two quite distinct operating states:

1. If $u$ is the threshold voltage of the diodes, where $Ve < -u(R1/R2)$, the continuous transfer function is given by:

$$Vs/Ve = - (R2/R1)$$

The continuous stability is therefore ensured.

2. Where $Ve > -u(R1/R2)$, a "perfect" integration will be ensured in a wide frequency range:

$$Vs/Ve = - (1/R1 \cdot Cp)$$

Indeed, in the first case, neither of the diodes D1, D2 being conductive, this is the case of the diagram according to FIG. 2, the gain of the continuous circuit is limited and stability is ensured.

In the second case, one of the diodes is conductive, according to the polarity of the output voltage $Vs$. In this way, the positive reaction path $R2 - R1$, in the lower part of the figure compensates the effect of the negative reaction path $R2 - R1$ at the upper part of that figure. The result is that the shunt effect of the resistor R2 in parallel with the capacitor C is canceled, and the conditions observed are those of "perfect" integration in a wide frequency range.

The detailed calculation of the transfer function in the various cases, which it does not seem essential to reproduce in the description, confirms these results.

As an order of practical magnitude, for example, the following will be observed:

$$u = 300 \text{ mV};\ R1/R2 = 1/1000.$$

What is claimed is:

1. An integrator comprising an operational amplifier having a first input, a second input and an output, a first resistor having a value $R1$ connected between said second input and ground, a capacitor shunted by a second resistor having a value of $R2$ connected between said output and said first input, the input voltage being applied to said first input through a third resistor having a value of $R1$, characterized in that said output is connected to said second input by a network comprising a diode combination including first and second diodes connected back-to-back in parallel, said diode combination being connected in series with a fourth resistor having a value equal to $R2$.

2. An integrator comprising an operational amplifier having a first input, a second input and an output, a first resistor connected between said second input and ground, a first feedback combination including a capacitor shunted by a second resistor connected between said output and said first input, a third resistor having the same value as said first resistor connected to said first input, and a second feedback combination including diode means connected between said output and said second input for controlling the gain of the amplifier at low input frequencies.

3. An integrator as defined in claim 2 wherein said diode means includes first and second diodes connected back-to-back in parallel.

4. An integrator as defined in claim 3 wherein said second feedback combination includes a fourth resistor having the same value as said second resistor connected in series with said first and second diodes.

* * * * *